(12) United States Patent
Shimanuki et al.

(10) Patent No.: US 6,755,399 B2
(45) Date of Patent: Jun. 29, 2004

(54) HUMIDIFIER

(75) Inventors: Hiroshi Shimanuki, Saitama (JP);
Toshikatsu Katagiri, Saitama (JP);
Yoshio Kusano, Saitama (JP);
Motohiro Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/764,391

(22) Filed: Jan. 19, 2001

(65) Prior Publication Data

US 2001/0015500 A1 Aug. 23, 2001

(30) Foreign Application Priority Data

Jan. 19, 2000 (JP) .......................................... 2000-010972

(51) Int. Cl.⁷ ................................................ B01F 3/04
(52) U.S. Cl. ................................ 261/104; 95/52; 96/8
(58) Field of Search ........................... 261/104; 96/8; 95/52

(56) References Cited

U.S. PATENT DOCUMENTS

| | | | | |
|---|---|---|---|---|
| 4,007,601 A | * | 2/1977 | Webbon ..................... | 261/104 |
| 4,146,597 A | * | 3/1979 | Eckstein et al. ............ | 261/104 |
| 4,666,469 A | * | 5/1987 | Krueger et al. ............. | 96/8 |
| 4,707,267 A | * | 11/1987 | Johnson ..................... | 96/8 |
| 5,525,143 A | * | 6/1996 | Morgan et al. ............. | 95/52 |
| 6,210,464 B1 | * | 4/2001 | Nakanishi et al. .......... | 95/52 |
| 6,394,084 B1 | * | 5/2002 | Nitta ......................... | 128/201.13 |
| 2001/0015501 A1 | * | 8/2001 | Katagiri et al. ............. | 261/104 |

FOREIGN PATENT DOCUMENTS

JP  A-7-71795  3/1995

* cited by examiner

*Primary Examiner*—Scott Bushey
(74) *Attorney, Agent, or Firm*—Arent Fox, PLLC

(57) ABSTRACT

A humidifier having a plurality of water-permeable hollow fiber membranes placed along the lengthwise direction of a housing accommodated within the housing in which gases each having a different moisture content flow inside and outside the hollow fiber membranes to carry out moisture exchange whereby the dry air having a low moisture content is humidified is disclosed. The humidifier comprises a bypass channel having a larger diameter than that of the hollow fiber membrane, in which the gas flowing outside the hollow fiber membrane, formed on an approximately central portion of the cross-lengthwise direction of the housing along the lengthwise direction of the housing, and an inlet which introduces the gas flowing outside the hollow fiber membrane into the housing and an outlet which discharges the gas flowing outside the hollow fiber membrane formed on the bypass channel.

7 Claims, 9 Drawing Sheets

X-X cross-section

Y-Y cross-section

US 6,755,399 B2

HUMIDIFIER

FIELD OF THE INVENTION

The present invention relates to a humidifier, a fuel cell system utilizing the same and a humidification process, and particularly to a humidifier utilizing a hollow fiber membrane, a fuel cell system utilizing the same and a humidification process.

BACKGROUND ARTS

Fuel cell systems, especially solid polymer fuel cell systems are widely known as a power source for electric vehicles. In such fuel cell systems, a humidifier is used to moisture-exchange off gas, viz. moist gas discharged from a fuel cell, between its moisture and air as a dry gas, and to generate humidified air or humidified gas. Preferably, a humidifier used with such fuel cell systems is of a lower power consumption type, and is required compactness with less attachment space. For this reason, among many other humidifiers, such as a supersonic humidifier, a steam humidifier, a vaporizing humidifier and a nozzle injection type humidifier, a humidifier utilizing water permeable membranes, especially hollow fiber membranes is commonly used with a fuel cell.

A conventional humidifier utilizing hollow fiber membranes is disclosed in Japanese Laid-open Patent Publication No. HEI-7-71795. As shown in FIG. 14, a humidifier 300 comprises a housing 300, on which is provided a first inlet 302 for introducing dry air and a first outlet 303 for discharging the dry air (humidified dry air). A bundle of hollow fiber membranes 304 consisting of a number of for example 5000 hollow fiber membranes is accommodated within the housing 301.

At both ends of the housing 301, fastening members 305, 305' are provided for fixing the ends of the bundle 304 while leaving them open. Outside of the fastening member 305 is provided a second inlet 306 for introducing moist air or moist gas, and a second outlet 307 is provided outside of the fastening member 305' for discharging the moist air, moisture of which is separated and removed at the bundle of hollow fiber membranes 304. The fastening members 305, 305' are covered with a first head cover 308 and a second head cover 309, respectively. And the second inlet 306 is formed on the first head cover 308, while the second outlet 307 is formed on the second head cover 309.

In the aforementioned humidifier 300 utilizing hollow fiber membranes, the moist air introduced from the second inlet 306 passes through the hollow fiber membranes forming the bundle of hollow fiber membranes 304, and the moisture within the moist air is separated by capillary action of the hollow fiber membranes. The separated moisture moves outward of the hollow fiber membrane through a capillary tube of the membrane. The moisture-removed air is discharged from the second outlet 307.

Meanwhile, dry air is supplied from the first inlet 302. The dry air from the first inlet 302 flows outside of the hollow fiber membranes forming the bundle of hollow fiber membranes. Because the moisture separated from the moist air has moved outside of the hollow fiber membranes, the moisture humidifies the dry air. The humidified dry air is then discharged from the first outlet 303.

However, in the conventional humidifier 300 shown in FIG. 14, the first air inlet 302 which introduces the dry air is formed on the housing 301 at the side near the center of the lengthwise direction thereof. For this reason, as shown in the black arrow of FIG. 14, the dry air flowing outside of the hollow fiber membranes in the bundle 304 of the hollow fiber membrane stored within the housing 301 flows the central portion in the lengthwise direction within the housing 301. Consequently, the areas S residing near the ends of the bundle 304 of the hollow fiber membranes do not contribute to the exchange of water in a sufficient manner and, thus there is a problem that the ratio of moisture recovery at such portions unduly low in relative to the permeable water within the hollow fiber membranes.

SUMMARY OF THE INVENTION

The object of the present invention is to make it possible to water exchange in a sufficient manner even at the portions near the ends of the hollow fiber membranes of the bundle of the hollow fiber membranes stored within the housing to thereby improve the ratio of moisture recovery of the humidifier.

According to the present invention which can attain these and other objects, there is provided a humidifier having a plurality of water-permeable hollow fiber membranes placed along the lengthwise direction of a housing accommodated within the housing in which gases each having a different moisture content flow inside and outside said hollow fiber membranes to carry out moisture exchange whereby the dry air having a low moisture content is humidified, said humidifier comprising: a bypass channel, in which the gas flowing outside the hollow fiber membrane, formed on an approximately central portion of the cross-lengthwise direction of said housing along the lengthwise direction of said housing, said bypass channel having a diameter larger than that of said hollow fiber membrane, and an inlet which introduces the gas flowing outside the hollow fiber membrane into the housing and an outlet which discharges the gas flowing outside the hollow fiber membrane formed on said bypass channel.

The humidifier of the present invention has a bypass channel formed on an approximately central portion of the cross-lengthwise direction of said housing along the lengthwise direction of said housing. Since the bypass channel has a diameter larger than that of said hollow fiber membrane, the gas flowing outside the hollow fiber membrane is introduced into the bypass channel. By being passed through the bypass channel, the gas flowing outside the hollow fiber membrane can be transferred to every areas of the housing. Consequently, since the gas can be supplied over the entire area of the bundle of the hollow fiber membranes, the moisture exchange can be effectively carried out even at an end of the housing, enhancing the moisture recovery.

The term "an approximately central portion of the cross-lengthwise direction of the housing" used herein does not have a meaning of being completely accorded with the center of the cross-lengthwise direction of the housing (the center of the axis), but means to encompass the portion slightly out of the center. Furthermore, it is possible for the formation of the bypass channel if the circumference of the bypass channel is surrounded by the hollow fiber membranes.

In a preferred embodiment of the humidifier according to the present invention, a plurality of the outlets which discharge the gas flowing outside the hollow fiber membrane are formed on said bypass channel at several distance.

According to this embodiment, a plurality of the outlets which discharge the gas flowing outside the hollow fiber membrane are formed on said bypass channel at several distance.

In this embodiment, since a plurality of the outlets which discharge the gas flowing outside the hollow fiber membrane are formed on said bypass channel at several distance, the gas flowing outside the hollow fiber membrane can be discharged in the lengthwise direction in a substantial uniform manner. For this reason, the gas flowing outside the hollow fiber membrane can be supplied to substantially the entire areas of the housing. Accordingly, the moisture exchange can be carried out with higher efficiency.

According to this embodiment, an inlet port for the introduction of the gas flowing outside the hollow fiber membrane into the housing and an outlet port which discharges the gas flowing outside the hollow fiber membrane are formed on the housing, and said inlet port and said outlet port are placed opposite each other beyond the bypass channel.

In this embodiment, an inlet port for the introduction of the gas flowing outside the hollow fiber membrane into the housing and an outlet port which discharges the gas flowing outside the hollow fiber membrane are formed opposite each other beyond the bypass channel. For this reason, the gas flowing outside the hollow fiber membrane introduced from the inlet port flows outside the hollow fiber membrane, while moving in the cross-lengthwise direction of the housing. Consequently, the distance of the movement of the gas flowing outside the hollow fiber membrane becomes longer and, thus, the moisture exchange can be carried out in a sufficient manner, making it possible to enhance the moisture recovery.

The humidifier according to the present invention having such a construction can be advantageously utilized as a humidifier for the fuel cell system.

According to the present invention, there is also provided a humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, comprising: a step for subjecting one of said gas to flow in the bypass channel; a step for subjecting said gas from the bypass channel to flow outside the hollow fiber membrane; and a step for carrying out a moisture exchange between said gas flowing outside the hollow fiber membrane and the gas flowing inside the hollow fiber membrane.

DESCRIPTION OF THE PREFERRED EMBODIMENTS

Figure 1:
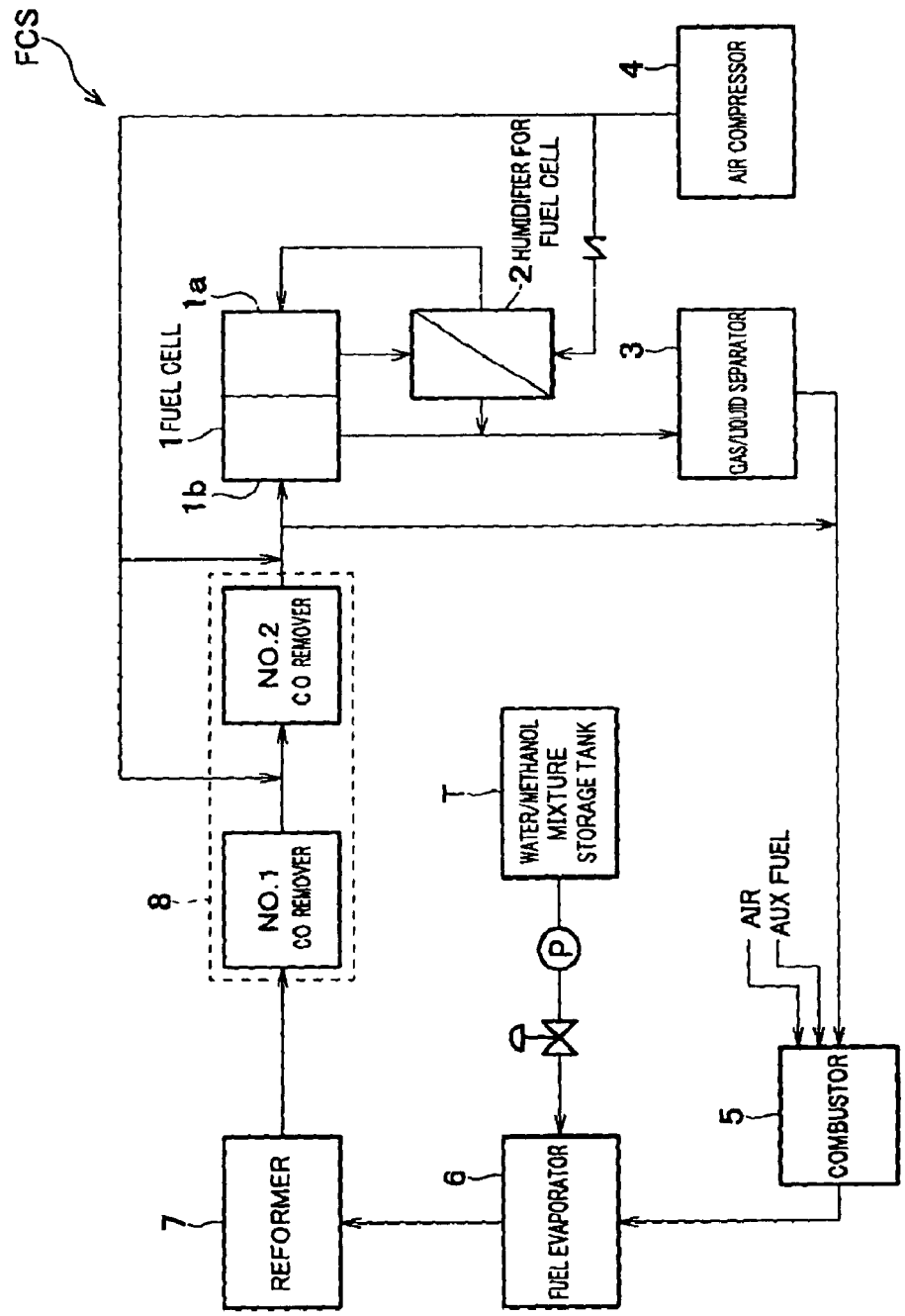
FIG. 1 is a drawing totally showing the fuel cell system.

The embodiments of the present invention will now be described by referring to the drawings.

By referring to FIG. 1, the total configuration of the fuel cell system and the functions thereof will now be described.

Fuel cell system FCS is comprised of a fuel cell (stack) 1, a humidifier 2, a gas/liquid separator 3, an air compressor 4, a combustor 5, a fuel evaporator 6, a reformer 7, a CO remover 8, water/methanol mixed solution storage tank T (hereinafter simply referred to as "tank"), and the like.

In the fuel cell 1, humidified air as an oxidant gas is supplied to an oxygen pole side 1a and hydrogen-enriched gas as a fuel gas is supplied to a hydrogen pole side 1b. The fuel cell 1 takes an electric energy from the chemical energy brought about due to the chemical reaction between oxygen and hydrogen to generate a power. The humidified air is brought about by compressing atmospheric air (air), which is compressed by the air compressor 4, and then humidifying the compressed air in the humidifier 2. The humidification of the dry air is carried out through the moisture-exchange between the off gas which contains a relatively large amount of water discharged out of the oxygen pole 1a and the dry air which has a relative small water content, and the details of which will be described later on. The fuel gas occurs when the mixed liquid of water and methanol, which is a raw fuel liquid, is evaporated in the fuel evaporator 6, and reformed in the reformer 7, followed by the removal of carbon monooxide (CO) in the CO remover 8. The raw fuel liquid stored in the tank T is metered through a pump P to the fuel evaporator 8 at which the liquid fuel is evaporated and mixed with air for the reformation to provide a raw fuel gas, the resulting raw fuel gas is supplied to the reformer 7, and then to the CO remover 8 at which CO is removed. In the reformer 7, methanol is steam-reformed and partially oxidized in the presence of a catalyst. In the CO remover 8, CO is selectively oxidized in the presence of a catalyst to be converted into $CO_2$. In order to quickly remove decrease the concentration of carbon oxide, the CO remover is composed of two CO removers, i.e., No. 1 CO remover and No. 2 CO remover. The air compressor 4 supplies air for the selective oxidation to the CO remover 8.

The off gas containing a large amount of the produced water at the oxygen pole side 1a and the off gas containing hydrogen remaining unreacted at the hydrogen pole side 1b occur at the same time. The off gas at the oxygen pole side 1a is used for the humidification of the air in the humidifier 2 as described above, after which it is mixed with the off gas at the hydrogen pole side 1b, and the water contained therein is removed through the gas/liquid separator 3. Consequently, the off gas from which the water is removed (mixed off gas) is combusted in the combustor 5, and is used as a heat source for the fuel evaporator 6. It is noted that an auxiliary fuel (methanol etc.) and air are supplied to the combustor 5 in order to supply a deficient calorie and to warm up the fuel cell system FCS at starting.

Figure 2:
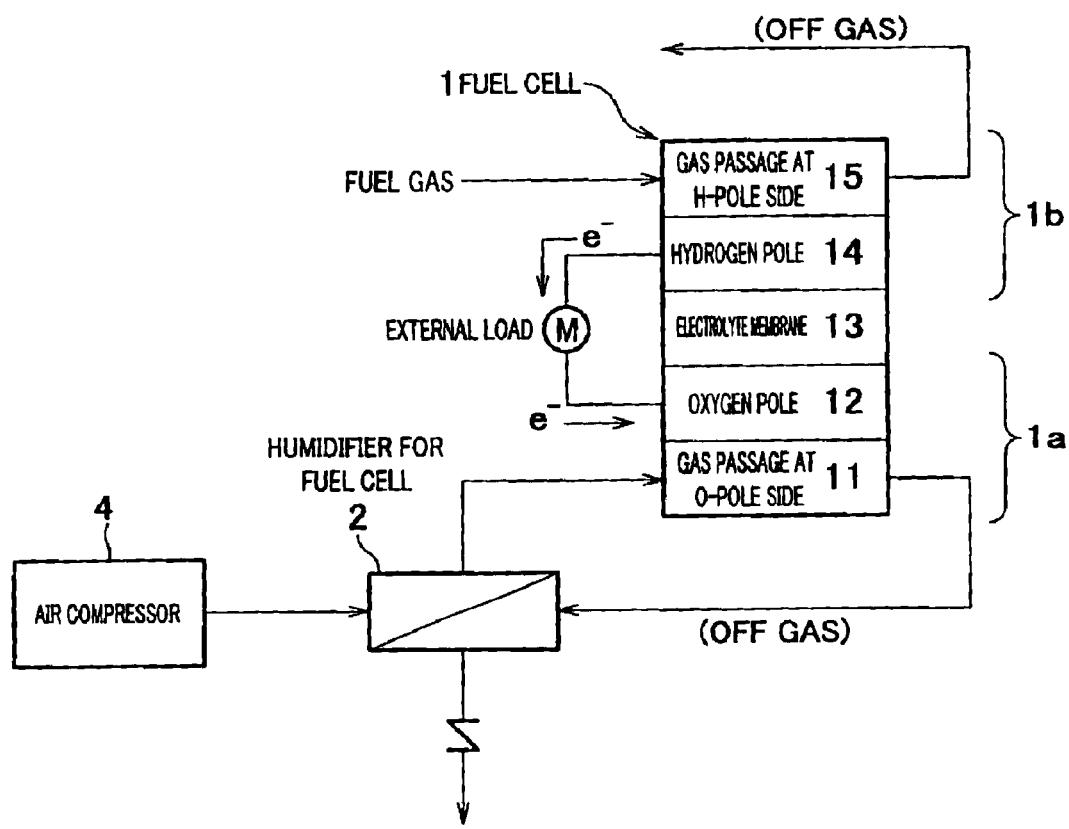
FIG. 2 is an explanative view outlining the configuration of the fuel cell system.

The configuration and functions of the fuel cell will now be described by referring to FIG. 2. In FIG. 2, the fuel cell 1 is expressed as a single cell in order to simplify the configuration. (Actually, the fuel cell 1 is configured as to be a laminate having approximately 200 single cells laminated).

As shown in FIG. 2, the fuel cell 1 is divided into the hydrogen pole side 1b and the oxygen pole side 1a across a electrolyte membrane 13, and each of the poles has an electrode containing a platinum series catalyst to form a hydrogen pole 14 and an oxygen pole 12. In this figure, the diffusion layer is omitted. The hydrogen-enriched gas occurring from the raw fuel liquid is passed through a gas passage 15 at the hydrogen pole side as the fuel gas, while the humidified air humidified in the humidifier 2 is passed through a gas passage 15 at the oxygen pole side as the oxidant gas. As electrolyte membrane 13 which can be used herein, a solid macromolecular membrane, such as perfluorocarbon sulfonic acid, which is a proton-exchange membrane, has been known. The electrolyte membrane 13 has a plurality of proton-exchanging groups in the solid macromolecule, and has a low specific resistance lower than 20 Ù-proton at a normal temperature, when being saturated with water, serving as a proton-conductive electrolyte. Consequently, the protons produced by the ionization of hydrogen in the presence of the catalyst are easily migrated in the electrolyte membrane 13, and reach the oxygen pole 13, at which the protons are readily reacted with the oxygen ions produced from the humidified air in the presence of the catalyst to produce water. The produced water is discharged from an outlet residing at the oxygen pole side 1a of the fuel cell 1 as a moist off gas together with humidified air. At the time of the ionization of hydrogen, electrons e⁻ are produced in the hydrogen pole 14. The produced electrons e⁻ reach the oxygen pole 14 via an external load M such as a motor.

The reason why the humidified air is supplied to the fuel cell 1 as an oxidant gas is that power generation efficiency is decreased due to the lowered proton conductivity in the electrolyte membrane 13 if the electrolyte membrane 13 is dried. On the other hand, if the electrolyte membrane 13 is humidified in excess, the electrodes, the diffusion layers as such (typically at the oxygen pole side). Consequently, in the fuel cell system FCS utilizing the solid macromolecular type fuel cell 1, the humidification is of important meanings. The raw fuel liquid contains a large amount of water, which is used for the purpose of humidifying the hydrogen pole side 1b in addition to the reformation of the methanol in the raw fuel liquid.

Figure 4A:
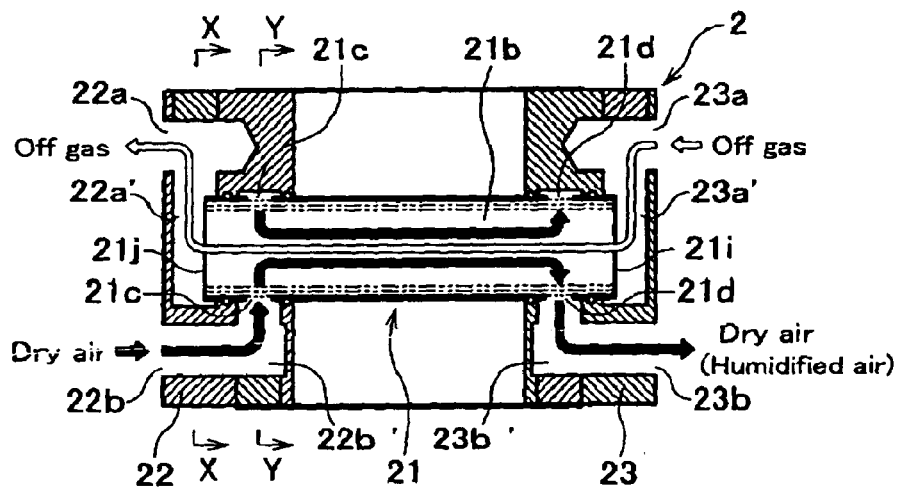
FIG. 4A is a side cross-sectional view of the humidifier according to the present invention.
Figure 4B:
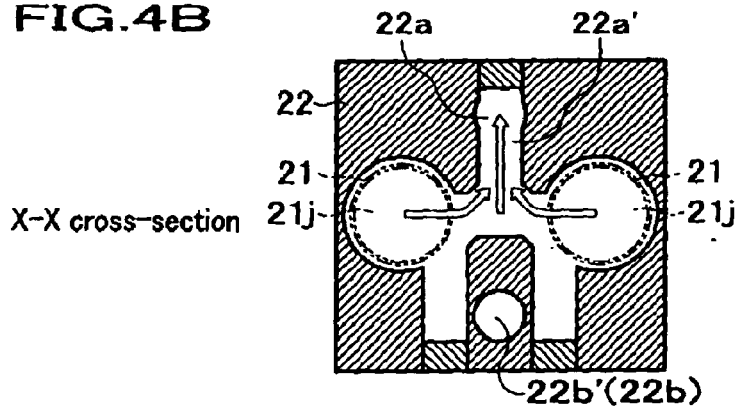
FIG. 4B is a cross-sectional view taken along the line X—X of FIG. 4A.
Figure 4C:
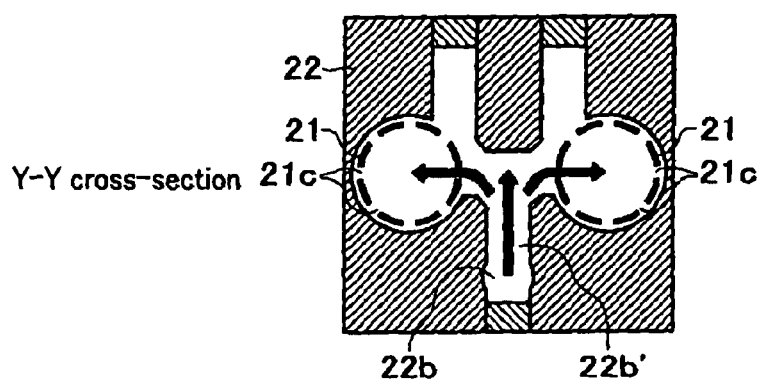
FIG. 4C is a cross-sectional view taken along the line Y—Y of FIG. 4A.
Figure 5:
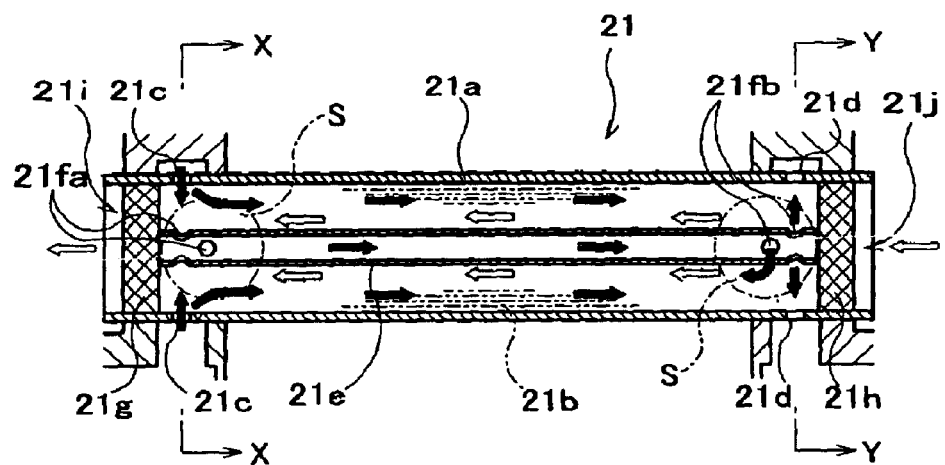
FIG. 5 is a side cross-sectional view of the humidifier according to the first embodiment of the present invention.
Figure 6A:
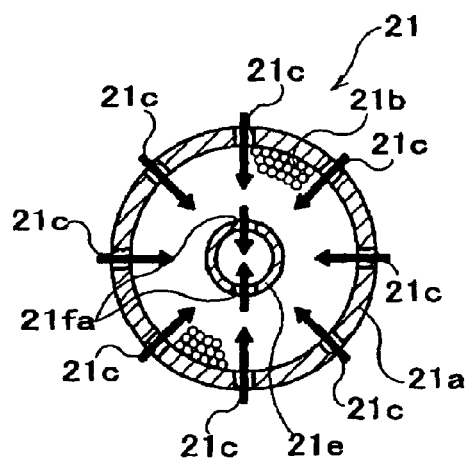
FIG. 6A is cross-sectional view taken along the line X—X of FIG. 5.
Figure 6B:
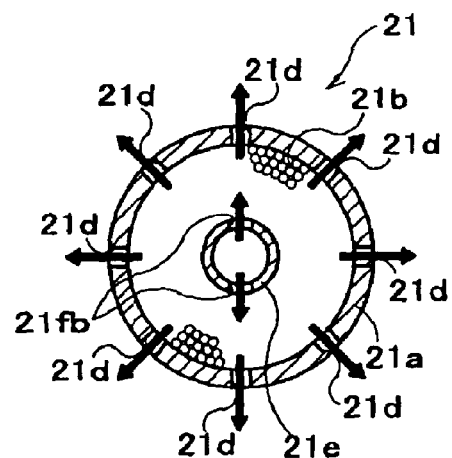
FIG. 6B is cross-sectional view taken along the line Y—Y of FIG. 5.

Subsequently, the humidifier 2 according to the present invention will now be described by referring to FIGS. 3 to 5. In FIGS. 3 to 11, the flow of the off gas which is "the gas flowing inside the hollow fiber membrane" is shown as a white arrow, and the dry air (humidified air) which is "the gas flowing outside the hollow fiber membrane" is shown as a block arrow.

Figure 3A:
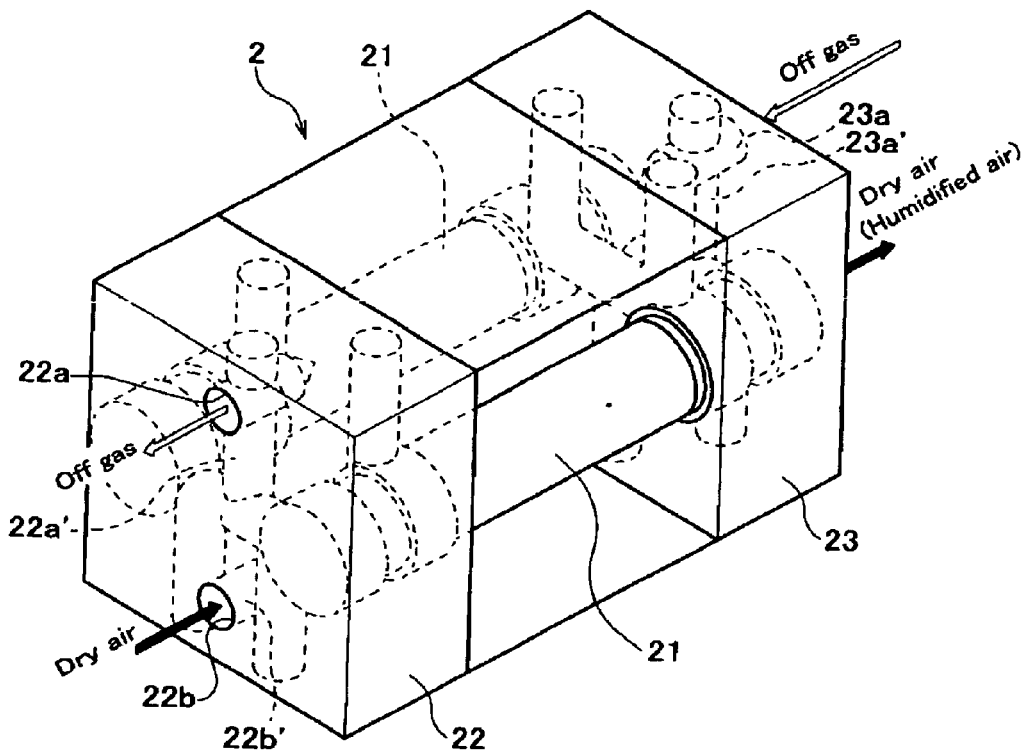
FIG. 3A is a perspective view of the humidifier according to the present invention.

As shown in FIG. 3A, the humidifier 2 according to the first embodiment of the present invention possesses two parallel hollow fiber membrane modules 21 and 21 each having a substantially cylindrical shape, a boxy distributor 22 at one end and a boxy distributor 23 at another end. The humidifier 2 is totally confabulated to have a rectangular parallelepiped form. These two hollow fiber membrane modules 21 and 21 are placed at a predetermined space in parallel and fixed by means of the distributors 22 and 23 at both ends. In each of two hollow fiber membrane modules 21 and 21, the dry air is supplied and the wet off gas is discharged via the distributor 22 at one end, and the humidified air in which the dry air is humidified is discharged and the off gas is supplied via the distributor 23 at another end.

Figure 3B:
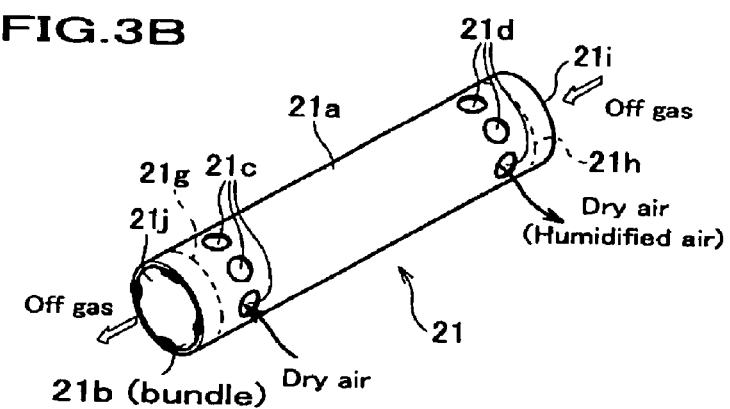
FIG. 3B is a perspective view of the hollow fiber membrane module.

As shown in FIG. 3B, the hollow fiber membrane module 21 possesses a housing 21a. As shown in FIGS. 4 and 5, the bundle 21b of the hollow fiber membranes composed of water-permeable hollow fiber membranes bundled with each other placed along the lengthwise direction thereof is accommodated within the housing 21b. The hollow fiber membrane has a plurality of capillaries with a diameter of several nm from inside to outside. In the capillary, the vapor pressure is decreased whereby the condensation of the water easily occurs. The condensed water is drawn up due to the capillary phenomenon and the water is permeated through the hollow fiber membrane.

The housing 21a has a hollow cylindrical form both ends of which are opened. At one end of the housing 21a in the lengthwise direction, eight (8) inlets 21c, 21c, . . . for introducing the dry air are formed at interval in the circumferential direction. At another end of the housing 21a in the lengthwise direction, eight (8) outlets 21d, 21d, . . . for the humidified air are formed at interval in the circumferential direction.

As shown in FIG. 5, a hollow bypass tube 21e making up a bypass channel for causing the dry air to flow is formed at a central portion in the cross-lengthwise direction of the housing. The inner diameter of the bypass tube 21e is larger than that of the hollow fiber membrane and is for example, from 1 to 5 cm. On one end of the bypass tube 21e, a plurality of, for example, eight, inlet ports 21fa, 21fa . . . for the introduction of the dry air are placed in the circumferential direction at a several interval. The positions where these inlet ports 21fa, 21fa . . . for the introduction of the dry air are placed are in adjacent to one end of the housing 21a in the lengthwise direction. For this reason, the dry air introduced from the inlet ports 21fa, 21fa . . . for the introduction of the dry air is passed through a portion in adjacent to one end of the housing 21a in the lengthwise direction. Typically, the portion in adjacent to one end of the housing 21a in the lengthwise direction is, for example, approximately 1 cm, 3 cm or 5 cm away from a potting portion 21g, which will be described later on.

On another end of the bypass tube 21e, a plurality of, for example, eight, outlet ports 21fb, 21fb . . . for discharging the dry air flowing within the bypass tube 21e are placed in the circumferential direction at a several interval. The positions where these outlet ports 21fb, 21fb . . . for the dry air are placed are in adjacent to another end of the housing 21a in the lengthwise direction. For this reason, the dry air discharged from these outlet ports 21fb, 21fb . . . is passed through a portion in adjacent to one end of the housing 21a in the lengthwise direction. Typically, the portion in adjacent to another end of the housing 21a in the lengthwise direction is, for example, approximately 1 cm, 3 cm or 5 cm away from a potting portion 21g, which will be described later on, similar to the case of the inlet ports 21fa, 21fa . . .

A part of the dry air introduced from the inlet 21c, 21c . . . for the dry air flow flows in the direction where the outlets 21d, 21d . . . for the dry air flow are formed as it is. Another part of the dry air is introduced from the inlet ports 21fa, 21fa . . . into the bypass channel within the bypass tube 21e. The dry air introduced into the bypass tube 21e is passed through the interior of the bypass tube 21e and is then discharged from the outlet ports 21fb, 21fb . . .

On the other hand, the bundle 21b of the hollow fiber membranes accommodated within the housing 21a composed of is potted in such a manner that plurality of (e.g., several thousands of) water-permeable hollow fiber membrane each having hollow passage are bundled, and a potting portion 21g at one end and a potting portion 21h at another end are provided for potting the hollow fiber membranes. The potting portion 21g at one end resides at the portion somewhat nearer than the end than the position where the inlets 21c, 21c, 21c . . . for the dry air.

An outlet 21i for the off gas flow is formed outside the potting portion 21g, while an inlet 21 for the off gas is formed further outside the potting portion 21h. As described above, in the case where the potting portions 21g and 21h are separated, the inlet 21j and the outlet 21i for the off gas flow are communicated with the inside of each hollow fiber membrane making up the bundle 21b of the hollow fiber membranes, and the outside of the each hollow fiber membrane, the inlet 21j and the outlet 21i are kept gastightly. By such a configuration as described above, the off gas which flows through the hollow passage, which is within the hollow fiber membrane is not mixed with the dry air flowing outside the hollow fiber membrane. In addition, the off gas introduced from the inlet 21j is distributed into each hollow fiber membrane at the position outside the potting portion 21h, while the off gas discharged from each hollow fiber membrane is collected at the position outside the potting portion 21g. The hallow fiber membrane module 21 configured as described above is formed by inserting a predetermined number of the hollow fiber membranes into the housing 21a, thoroughly fixing the portions near both end surfaces with an adhesive to form the potting portions 21g and 21f, cutting the bundle of hollow fiber membranes along both ends of the housing 21a.

The distributor 22 at one end and the distributor 23 at another end fix two hollow fiber membrane modules 21 and 21 in a predetermined positional relation. The distributor 22 at one end possesses the outlet 22a of the off gas and the inlet 22b for the dry air. As shown in FIGS. 4A and 4B, the outlet 22a for the off gas is communicated with the outlet 21i for the off gas flow by means of an inner passage 22a' placed inside the distributor 22a at one end. As shown in FIGS. 4A and 4C, the inlet 22b for the dry air is communicated with inlets 21c, 21c, . . . for the dry air by means of an inner passage 22b' placed at the side of the distributor 22a at one side.

On the other hand, an inlet 23a for the off gas and an outlet 23b for the humidified air are formed on the distributor 23 at another end. The inlet 23a for the off gas is communicated with the inlet 21j for the off gas flow possessed by the hollow fiber membrane modules 21 and 21 by means of an inner passage 23a' placed inside the distributor 23 at another end. The outlet 23b for the humidified air is communicated with the outlets 21d, 21d, 21d . . . for the dry air formed at another end of the hollow fiber membrane modules 21 and 21 by means of an inner passage 23b' placed inside the distributor 23 at another end.

By packaging the hollow fiber membrane modules 21 and 21 as described above, the humidifier 2 can be produced in a small size while securing easy handling.

[Functions]

Next, the functions of the humidifier 2 will be described by referring to FIGS. 3 to 6.

The off gas shown as the white arrow, which is the moist gas flows in the humidifier 2 from the inlet 23a for the off gas possessed by the distributor 23 shown in FIGS. 3 and 4. The off gas introduced into the distributor 23 is passed through the inner passage 23a', and reaches the inlet 21j for the off gas flow of the hollow fiber membrane module 21. The off gas flowing within the housing 21a via the inlet 21j for the off gas flow is branched to each of the hollow fiber membranes in the bundle 21b of the hollow fiber membranes, and passed through the interior of each hollow fiber membrane. The off gas exiting the interior of each hollow fiber membrane flows out from the outlet 21i for the off gas flow. The off gas thus discharged flows within the inner passage 22a' of the distributor 22a, and then combined. The combined off gas reaches the outlet 22a for the off gas and is discharged from the outlet 22a, and then flows toward the later gas/liquid separator 3.

On the other hand, the dry air shown as the black arrow, which is the dry gas enters the humidifier 2 from the inlet 22b for the dry air, is passed through the inner passage 22b' to be distributed, and is introduced into the ring member 21e shown in FIG. 5 provided on one side of the hollow finer membrane modules 21 and 21. The dry air thus introduced flows within the ring member 21e, distributed into the inlets 21c, 21c, . . . for the dry air, and then introduced into the housing 21a. The dry air introduced into the housing 21a flows outside the hollow fiber membranes. At this time, the dry air flows outside the hollow fiber membranes, while off gas flows inside the hollow fiber membranes, and the moisture from the off gas is separated by the hollow fiber membrane. By the separated moisture, the dry air flowing outside the hollow fiber membranes is humidified to produce humidified air.

More specifically, the off gas containing a large amount of moisture (high moisture content) flows within the hollow fiber membrane and the dry air having a relatively low moisture content flows outside the hollow fiber membrane. Meanwhile, the moisture is condensed at the inside of the hollow fiber membrane is condensed, while the water is evaporated at the outside of the hollow fiber membrane by means of the dry air. Simultaneously, the moisture from the off gas condensed inside is supplied from the inside to the outside due to the capillary phenomenon. Specifically, the moisture permeation (water separation) takes place in the hollow fiber membrane on account of the difference between the moisture contents of the gases flowing inside and outside the propulsive power.

The humidified air thus obtained exits the outlets 21d, 21d, 21d . . . for the humidified air, and reaches the ring member 21f. The humidified air reaching the ring member 21f is discharged toward the inner passage 23b' of the distributor 23 as shown in FIG. 4A. At the inner passage 23b', the humidified air discharged from each of the hollow fiber modules 21 and 21 is combined, the combined humidified air flows toward the outlet 23b for the humidified air, after which it is supplied into the later gas/liquid separator 3.

The moisture exchange is carried out as described above. As shown in FIG. 5, in the present invention, a part of the dry air introduced from the inlets 21c, 21c, . . . for the dry air into the housing 21a flows outside the hollow membranes of the bundle 21 toward the outlets 21d, 21d, . . . On the other hand, the remaining part of the dry air introduced into the housing 21a is passed through the inlet ports 21fa, 21fa, . . .

and flows in the bypass tube 21e. Since the interior of the bypass tube 21e has a low resistance in comparison with the outside thereof, the dry air readily flows to the outlet ports 21fb, 21fb . . . The dry air flowing to the outlet ports 21fb, 21fb, . . . is discharged from the outlet ports 21fb, 21fb, . . . within the housing 21a.

The dry air introduced from the inlets 21c, 21c, . . . for the dry air and flowing outside the hollow fiber membranes of the bundle 21b of the hollow fiber membranes accommodated within the housing 21a toward the outlets 21d, 21d, . . . for the dry air flow as is mainly undergoes the moisture exchange at the central portion of the housing 21a in the lengthwise direction. On the other hand, the dry air being passed through the bypass tube 21e mainly undergoes the moisture exchange at the areas S and S in the lengthwise amongst the bundle 21b of the hollow fiber membranes. For this reason, since the dry air can be spread over substantially the entire area of the housing 21a. Consequently, since the moisture exchange can be carried out over the entire area of the bundle 21b of the hollow fiber membranes, the moisture recovery can be enhanced.

Figure 7:
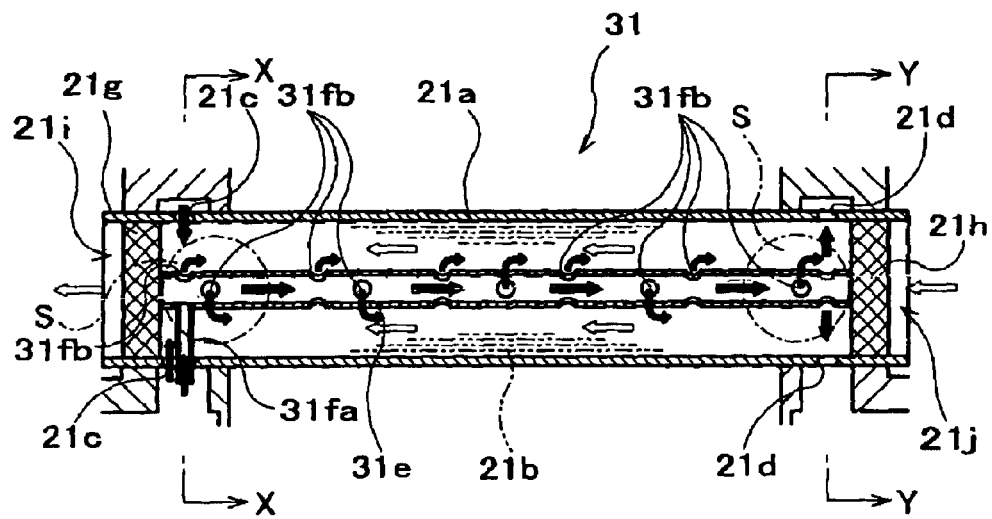
FIG. 7 is a side cross-sectional view of the humidifier according to the second embodiment of the present invention.
Figure 8A:
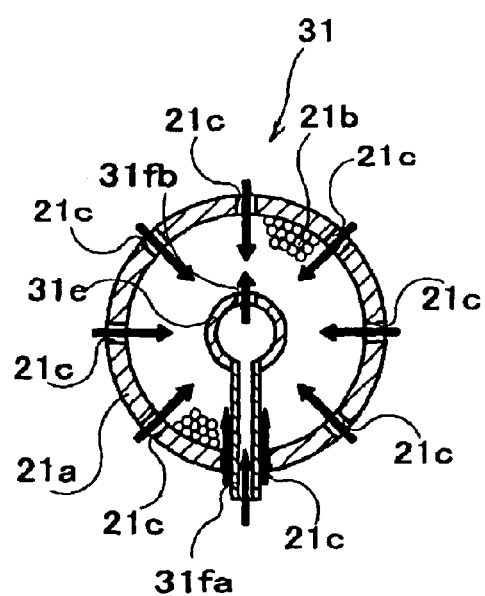
FIG. 8A is cross-sectional view taken along the line X—X of FIG. 7.
Figure 8B:
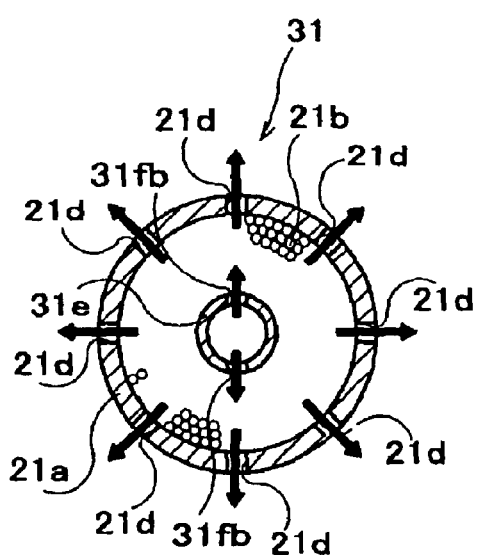
FIG. 8B is cross-sectional view taken along the line Y—Y of FIG. 7.

Next, the second embodiment of the present invention will be described by referring to FIGS. 8 and 9. FIG. 7 is a side cross-sectional view of the humidifier according to the second embodiment of the present invention, FIG. 8A is cross-sectional view taken along the line X—X of FIG. 7, and FIG. 8B is cross-sectional view taken along the line Y—Y of FIG. 7. In the second embodiment, those, which are common to the first embodiment, are omitted utilizing the same symbols, and the different configurations will be mainly described.

As shown in FIGS. 7 and 8, in the hollow fiber membrane module 31 according to this embodiment, a bypass tube 31e making up the bypass channel is placed differing in the first embodiment.

An inlet tube 31fa which directly introduces the dry air from the inlet port 22b for the dry air flow of the distributor 22 at the inlet side is provided on the bypass tube 31e. A plurality of outlet ports 31fb, 31fb, . . . are formed on the bypass tube 31e, and they are placed in the lengthwise direction of the bypass tube 32e at a several distance. Other configuration is the same as those of the first embodiment.

Functions of the humidifier 2 according to the second embodiment having such a configuration will be described.

The dry air via the inner passage 22b' at the distributor 22 is introduced from the inlets 21c, 21c, . . . for the dry air flow into the housing 21a. Simultaneously, the dry air is passed through the inlet tube 31fa to be introduced into the bypass tube 31e.

The dry air introduced from the inlets 21c, 21c, . . . for the dry air flow directly moves toward the outlet for the dry air flow. On the other hand, the dry air introduced into the bypass tube 31e is discharged from the outlet ports 31fb, 31fb, . . . placed in the lengthwise direction of the bypass tube 32e at a several distance. Since these outlet ports 31fb, 31fb, . . . are placed in the lengthwise direction of the bypass tube 32e at a several distance, the dry air introduced via the bypass tube 31e is spread over the entire area of the housing 21a from the central portion in the lengthwise direction of the housing 21a to the areas S, S corresponding to the end portions.

Accordingly, the moisture exchange can be carried out in a sufficient manner over the entire area of the bundle 21b of the hollow finer membranes from both ends to the central portion, making it possible to enhance the moisture recovery.

The dry air introduced at the outside portion of the hollow fiber membranes of the housing 21a from the inlet 21c, 21c, . . . for the dry air flow and the outlet ports 31fb, 31fb, . . . of the bypass tube 31e flows outside the hollow fiber membrane. At this time, the dry air is humidified with the moisture possessed by the off gas flowing inside the hollow fiber membrane. Then, the humidified air is discharged from the outlet for the humidified air flow to be supplied to the later gas/liquid separator 3 shown in FIG. 1.

Subsequently, the third embodiment of the present invention will be described by referring to FIG. 9.

Figure 9:
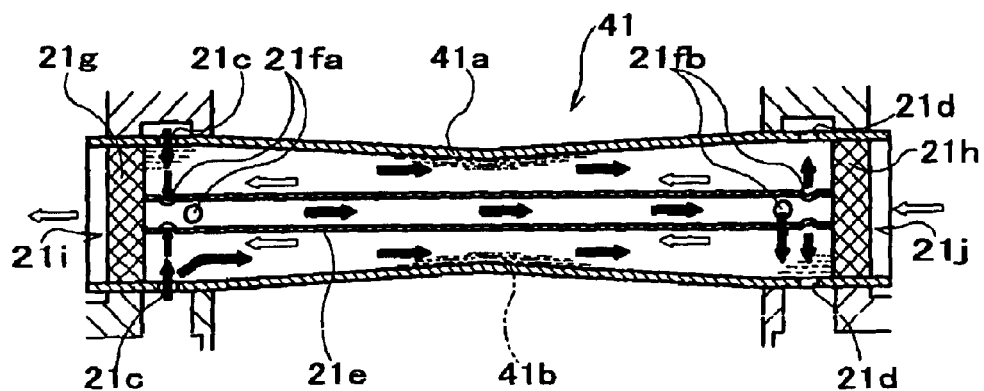
FIG. 9 is a side cross-sectional view of the humidifier according to the third embodiment of the present invention.

FIG. 9 is a side cross-sectional view of the humidifier according to the third embodiment of the present invention. In the third embodiment, those, which are common to the first embodiment, are omitted utilizing the same symbols.

As shown in FIG. 9, in a hollow fiber membrane module 41 according to this embodiment, the central portion of a housing 41a in the lengthwise direction is constricted toward the central direction of the axis. By this constriction, the center portion of a bundle 41b hollow fiber membranes accommodated within the housing 41a in the lengthwise direction comes up to the central direction of the axis. Other parts of this embodiment are the same as those of the first embodiment.

In this embodiment having such a configuration, the dry air is introduced from the inlets 21c, 21c, . . . for the dry air flow, and part of the dry air directly moves toward the outlets 21d, 21d, . . . for the dry air flow. Remaining part of the dry air is introduced into the bypass tube 31e from the inlet ports 21fa, 21fa, . . . placed at one end the bypass tube. The dry air introduced from the inlet ports 21fa, 21fa, . . . is discharged from the outlet ports 21fb, 21fb, . . . placed at another end the bypass tube.

Due to this constriction toward the central direction of the axis of the housing 41a in this embodiment, the cross-sectional area of the bundle 41b of the hollow fiber membranes at the site where the dry air introduced from the inlets 21c, 21c, . . . for the dry air flow is passed is smaller. Consequently, the dry air is readily spread over the entire are of the bundle of the hollow fiber membranes.

Subsequently, the fourth embodiment of the present invention will be described by referring to FIG. 10.

Figure 10:
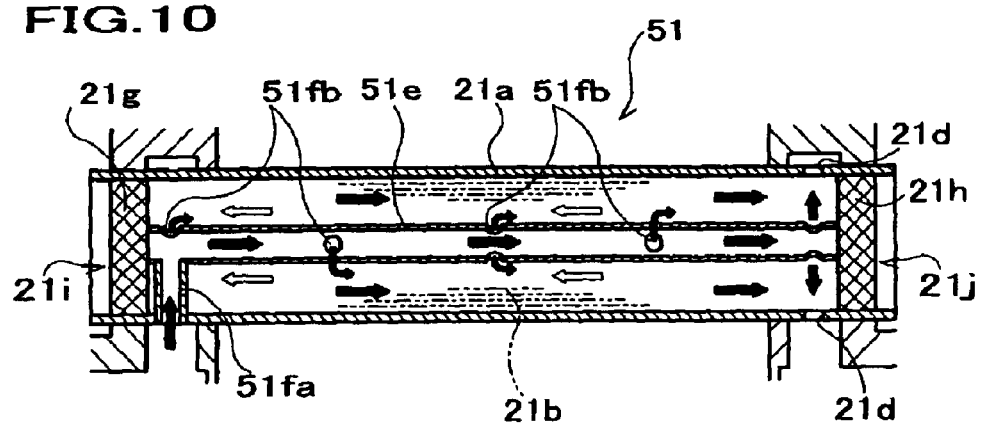
FIG. 10 is a side cross-sectional view of the humidifier according to the fourth embodiment of the present invention.

FIG. 10 is a side cross-sectional view of the humidifier according to the fourth embodiment of the present invention. In the fourth embodiment, those, which are common to the first embodiment, are omitted utilizing the same symbols.

As shown in FIG. 10, in the hollow fiber membrane module 51 according to this embodiment, a bypass tube 51e is placed within the housing 21a. To the bypass tube 51e is equipped an inlet tube 51fa for the introduction of the dry air having a large diameter. In this embodiment, no inlet port for directly introducing the dry air into the housing 21a is formed. Accordingly, the whole parts of the dry air introduced via the inner passage 22b' are introduced into the bypass tube 51e.

A plurality of outlet ports 51fb, 51fb . . . are placed on the bypass tube 51e. These outlet ports 51fb, 51fb . . . are placed in the lengthwise direction of the bypass tube 51e at a several distance. Other configuration is the same as those of the first embodiment.

According to this embodiment having such a configuration, the dry air is introduced from the outlet ports 51fb, 51fb . . . of the bypass tube 51e into the bypass tube 51e. The dry air introduced into the bypass tube 51e is discharged from a plurality of the outlet ports 51fb, 51fb . . . placed on the bypass tube 51e in the lengthwise direction of the bypass tube 51e at a several distance toward the bundle 21b of the hollow fiber membranes accommodated within the housing 21a. At this time, since the outlet ports 51fb, 51*fb* . . . are placed on the bypass tube 51*e* in the lengthwise direction of the bypass tube 51*e* at a several distance, the dry air can be supplied to the entire areas of the bundle 21*b* of the hollow fiber membranes. Accordingly, the moisture exchange can be carried out over the entire area of the bundle 21*b* of the hollow fiber membranes.

Next, the fifth embodiment of the present invention will be described by referring to FIG. 11.

Figure 11:
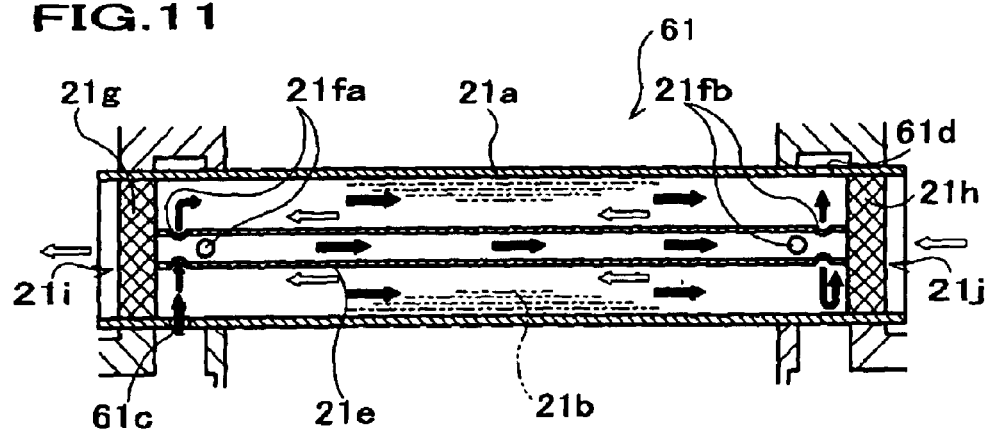
FIG. 11 is a side cross-sectional view of the humidifier according to the fifth embodiment of the present invention.

FIG. 11 is a side cross-sectional view of the humidifier according to the fifth embodiment of the present invention. In the fifth embodiment, those, which are common to the first embodiment, are omitted utilizing the same symbols.

As shown in FIG. 11, a hollow fiber membrane module 61 according to the fifth embodiment possesses one inlet 61*c* for the dry air flow formed at one end of the housing 21*a* and one outlet 61*d* for the dry air formed on another end. The inlet port 61*c* and the outlet port 61*c* are placed opposite each other beyond the bypass tube 21*e*.

According to this embodiment having such a configuration, the dry air discharged from the outlet ports 21*fb*, 21*fb* of the bypass channel 21*e* can also be spread toward the cross-length direction of the housing 21*a*. Consequently, the distance of the movement of the dry air flowing within the housing 21*a* becomes longer and, thus, the moisture exchange can be carried out in a sufficient manner, making it possible to enhance the moisture recovery.

Figure 12:
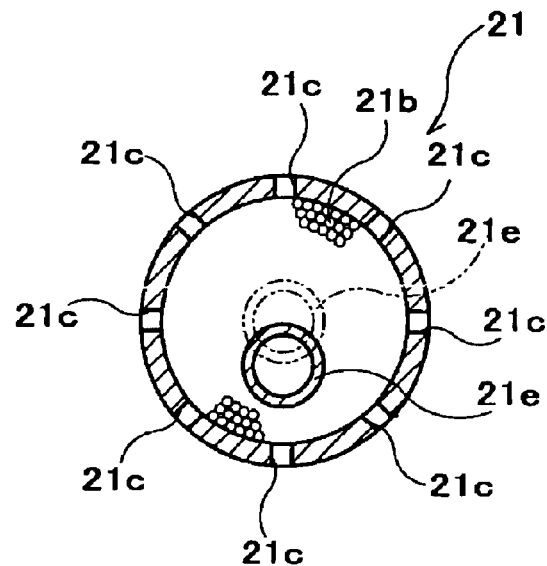
FIG. 12 is a longitudinally cross-sectional view showing one modification of the humidifier according to the first embodiment of the present invention.

In the embodiments described previously, whereas the bypass tube is placed at the central portion of the cross-lengthwise direction of the housing, the placement at this position is not essential requirement. For example, as shown in FIG. 12, the bypass tube 21*e* placed at the central position shown in a virtual line slightly moves downwardly. In addition, although not being shown in any figure, the position of the bypass tube may slightly moves upwardly, toward a side or aslant.

Figure 13A:
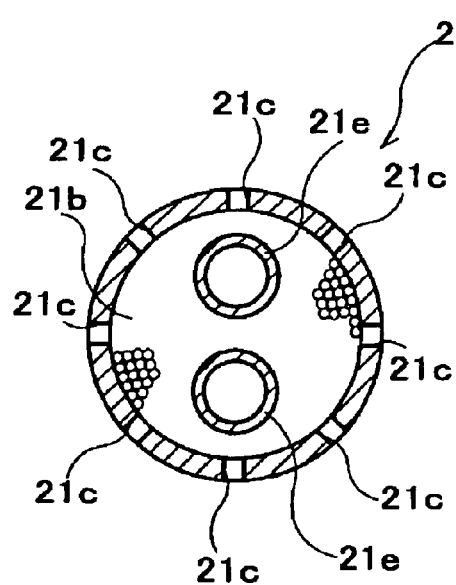
FIG. 13A is a longitudinally cross-sectional view showing another modification of the humidifier according to the first embodiment of the present invention.
Figure 13B:
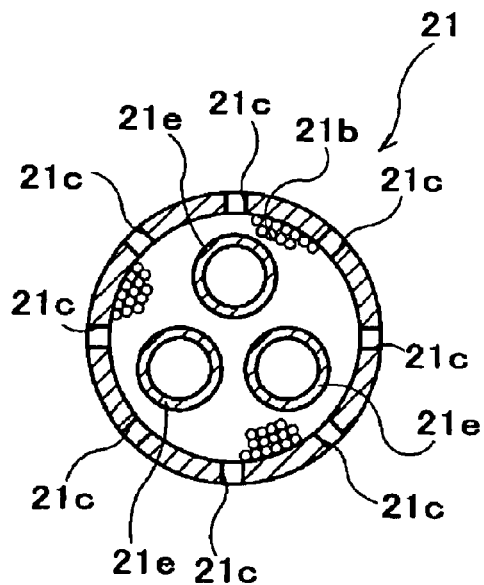
FIG. 13B is a longitudinally cross-sectional view showing still another modification of the humidifier according to the first embodiment of the present invention.
Figure 14:
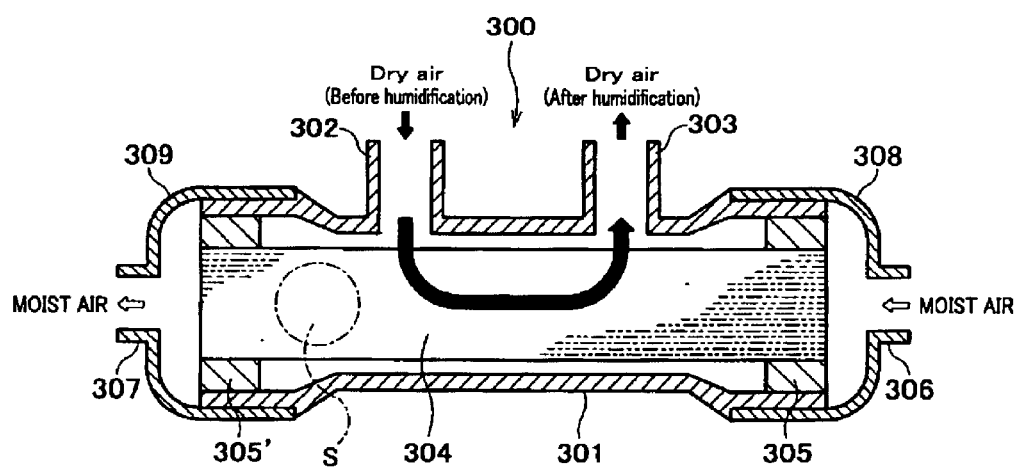
FIG. 14 is a cross-sectional view showing the conventional humidifier utilizing a hollow fiber membrane module.

Also, the number of the bypass tube is not restricted to one. For example, two bypass tubes 21*e* and 21*e* may be placed as shown in FIG. 13A or three bypass tubes 21*e*, 21*e*, and 21*e* may be placed.

While the invention has been described in detail and with reference to specific embodiments thereof, it will be apparent to one skilled in the art that various changes and modifications can be made therein without departing from the spirit and scope thereof. In the preferred embodiments, the dry air (humidified air) and the off gas flow through the hollow fiber membrane module in a counter-flow fashion. However, the dry air (humidified air) and the off gas may flow parallelly.

Counter-flowing the dry air and the off gas is advantageous because the humidity concentration difference within the hollow fiber membranes can be equalized and thus the water permeability thereof can be improved. Further, opposing layout of the gas inlet and the gas outlet facilitates arrangement of the gas conduit. Further, because heat exchanger effectiveness through the hollow fiber membrane is improved, cooling performance of the gas is improved. Furthermore, because of the higher heat exchanger effectiveness, the outlet temperature of the dry air is easily adjustable to the outlet temperature of the off gas, and thereby the temperature adjustment is facilitated. This facilitates management of the humidity of the air supplied to the fuel cell.

Temperature adjustment function of the humidifier will be described additionally.

For example, the dry air compressed by an air compressor such as a supercharger changes its temperature in the range of approximately from 30° C. (when idling the fuel cell) to 120° C. (at the maximum output of the fuel cell). Meanwhile, the fuel cell is operated at a temperature of approximately 80° C. under control of the temperature, and the off gas is discharged at a temperature of 80° C. and a little more. When flowing this off gas and the dry air compressed by the air compressor into the humidifier, thermal transfer as well as moisture transfer occurs through the hollow fiber membrane. As a result, the dry air is supplied to the fuel cell as a humidified air having a temperature close to the off gas that is a stable temperature close to the operating temperature of the fuel cell. In other words, when the output of the fuel cell is lower, such as in the idling time, the dry air is humidified and heated through the humidifier and is supplied to the fuel cell, however, when the output of the fuel cell is higher, such as in the maximum output of the fuel cell, the dry air is humidified and cooled through the humidifier and is supplied to the fuel cell as a humidified air within a stable temperature range. Therefore, with the temperature adjustment function of the humidifier, the fuel cell is operated under appropriate temperatures, leading to increased generation efficiency.

Further, when an inter-cooler is mounted at an exhaust side of the air compressor, the dry air compressed by the air compressor is cooled or heated, and changes its temperature in the range of approximately from 50° C. (when idling the fuel cell) to 60° C. (at the maximum output of the fuel cell). If the dry air passing through the inter-cooler is flown through the humidifier, where the off gas (having a temperature of 80° C. and a little more) flows, the dry air is humidified and heat-adjusted (heated) through the hollow fiber membrane and is supplied to the fuel cell as a humidified air having a temperature close to the off gas that is a stable temperature close to the operating temperature of the fuel cell. Therefore, even if an inter-cooler is mounted, with the temperature adjustment function of the humidifier, the fuel cell is operated under appropriate temperatures, leading to increased generation efficiency.

Furthermore, while two hollow fiber membrane modules are used in these embodiments, one module or three or more modules may of course be used. Also, while the off gas flows inside the hollow fiber membrane and the dry air flows outside the hollow fiber membrane, the off gas and the dry air flow outside and inside the hollow fiber membrane, respectively.

If moisture condensation occurs in the hollow fiber membrane modules and the like at a part of the housing, where the dry air or the humidified air flows, the outer surface area of the hollow fiber membranes will not be used effectively. For this reason, the humidified air is preferably drained out from a bottom part of the hollow fiber membrane module so as to prevent moisture condensation within the housing. With this arrangement, because condensed moisture together with the humidified air is drained out from the housing, occurrence of moisture condensation can be prevented. Preferably, the drained water is collected by a catch tank or the like, and is reused in other systems.

What is claimed is:

1. A humidifier having a plurality of water-permeable hollow fiber membranes placed along the lengthwise direction of a housing accommodated within the housing in which gases each having a different moisture content flow inside and outside said hollow fiber membranes to carry out moisture exchange whereby dry air having a low moisture content is humidified, said humidifier comprising:

a bypass channel, in which the gas flowing outside the hollow fiber membrane, formed on an approximately central portion of the cross-lengthwise direction of said housing along the lengthwise direction of said housing, said bypass channel having a diameter larger than that of said hollow fiber membrane, and an inlet placed at one end side of said bypass channel which introduces the gas flowing outside the hollow fiber membrane into the housing;

a plurality of outlets placed along the lengthwise direction of said bypass channel over the entire length of the bypass channel which discharge the gas flowing outside the hollow fiber membrane formed on said bypass channel; and a plurality of outlet ports formed in a circumferential direction on said housing at several intervals and placed opposite said inlet beyond the bypass channel, which discharges the gas which has flowed outside the hollow fiber membrane.

2. The humidifier according to claim 1, wherein a plurality of the outlets which discharge the gas flowing outside the hollow fiber membrane are formed on said bypass channel at several locations along the length of said bypass channel.

3. The humidifier according to claim 1, wherein an inlet port for the introduction of the gas flowing outside the hollow fiber membrane into the housing and an outlet port which discharge the gas flowing outside the hollow fiber membrane are formed on the housing, and said inlet port and said outlet port are placed opposite each other beyond the bypass channel.

4. The humidifier according to claim 2, wherein an inlet port for the introduction of the gas flowing outside the hollow fiber membrane into the housing and an outlet port which discharges the gas flowing outside the hollow fiber membrane are formed on the housing, and said inlet port and said outlet port are placed opposite each other beyond the bypass channel.

5. The humidifier according to claim 1, wherein an inlet port which introduces the whole of the gas flowing outside the hollow fiber membrane into the housing, is provided on said bypass channel.

6. A humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said hollow fiber membrane module having a bypass channel with a diameter larger than that of the hollow fiber membrane formed on an approximately central portion of the cross-lengthwise direction of said housing along the lengthwise direction of said housing of said hollow fiber membrane module, and with a plurality of outlets placed along the lengthwise direction of the entire length of the bypass channel said humidification process comprising:
introducing a part of one of said gases to flow in one end of the bypass channel along the lengthwise direction of the bypass channel, while subjecting the remaining part of the gas traverse the lengthwise direction of the bypass channel without first flowing along the lengthwise direction of the bypass channel to directly flow in one end of outside the hollow fiber membranes;

subsequently subjecting said gas introduced into the bypass channel to flow outside the hollow membrane module from said plurality of outlets placed along the lengthwise direction of the entire length of the bypass channel, to combine said gas having been introduced into the bypass channel with the remaining part of the gas, whereby said one of the gases is spread over the outside said hollow fiber membranes accommodated within said housing, and carrying out a moisture exchange between said gas flowing outside the hollow fiber membranes and said the gas flowing inside the hollow fiber membranes.

7. A humidification process utilizing a hollow fiber membrane module comprising a plurality of water-permeable hollow fiber membranes placed along the lengthwise direction of a housing accommodated within the housing, in which gases each having a different moisture content flow inside and outside said hollow fiber membranes to carry out moisture exchange whereby the dry air having a low moisture content is humidified, said hollow fiber membrane module having a bypass channel with a diameter larger than that of the hollow fiber membrane formed on an approximately central portion of the cross-lengthwise direction of said housing along the lengthwise direction of said housing of said hollow fiber membrane module and with a plurality of outlets placed along the lengthwise direction of the entire length of the bypass channel, and said housing having a plurality of outlet ports formed in a circumferential direction thereon, said humidification process comprising:
introducing a whole of one of said gasses into the bypass channel from one end of said bypass channel;

subsequently subjecting said gas introduced into the bypass channel to flow outside the hollow membrane module from said plurality of outlets placed along the lengthwise direction of the entire length of the bypass channel to be spread over the whole of outside said hollow fiber membranes, discharging said one of gasses spread outside said hollow fiber membranes from said plurality of outlet ports formed in a circumferential direction thereon; and carrying out a moisture exchange between said gas flowing outside the hollow fiber membranes and the gas flowing inside the hollow fiber membranes.

* * * * *